Jan. 21, 1964  E. J. LEY  3,118,235
LANGUAGE INSTRUCTION DEVICES
Filed April 24, 1961
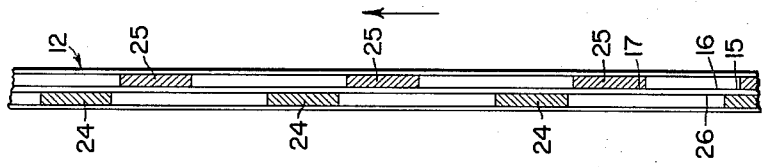
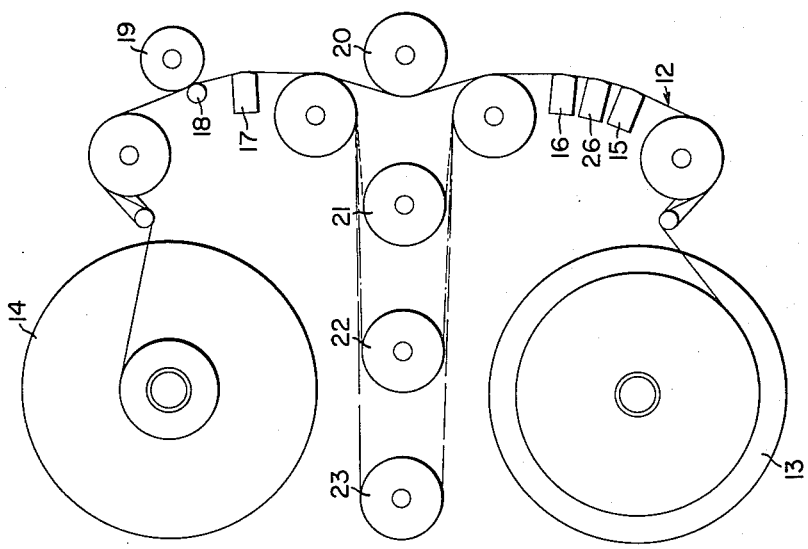
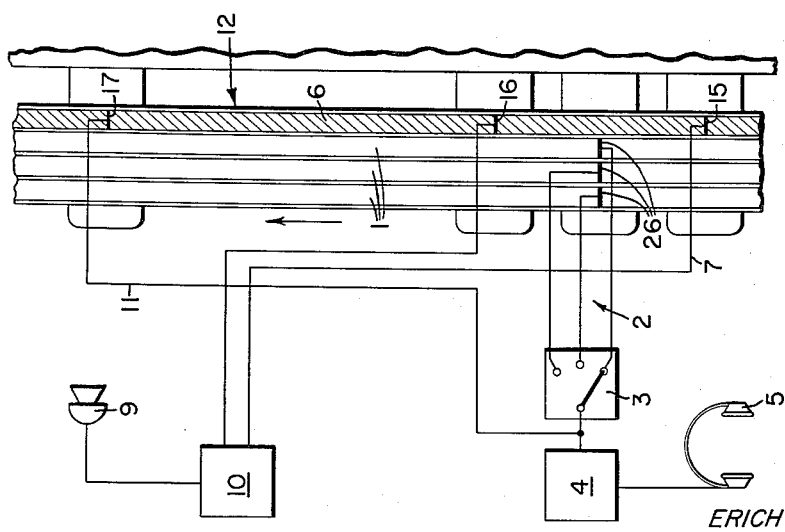
INVENTOR
ERICH JOSEF LEY
BY *Christy, Parmelee & Strickland*
ATTORNEYS

United States Patent Office 3,118,235
Patented Jan. 21, 1964

3,118,235
LANGUAGE INSTRUCTION DEVICES
Erich Josef Ley, 15 Zähringer Platz, Konstanz (Bodensee), Germany, assignor of one-half to Jacques Lory, Paris, France
Filed Apr. 24, 1961, Ser. No. 104,857
Claims priority, application Germany Apr. 29, 1960
2 Claims. (Cl. 35—35)

The present invention relates to sound recording and reproducing devices such as tape recorders and more specifically such tape recorders as are employed in the teaching of languages.

One object of the invention is to provide a tape recorder having on the tape permanently recorded instructional tracks with instructional track following means and with means for recording and playing back erasable student's responses, whereby the student may hear the spoken instructions, record his responses thereto and thereafter hear his responses played back to him all in sequential steps without interruption or reversal of the direction of movement of the tape.

Another object of the invention is to provide a tape for such recorders, wherein a plurality of permanent instructional tracks may be disposed in parallel relation upon the same tape and selectively played back, along with space for recording the student's response and sequential play-back of such responses.

Another object of the invention is to provide an adjustable roller take-up device for accommodating the increased length of tape when selectively providing increased intervals along the student recording track for receiving the longer intervals of spoken instructions, recording the spoken response of the student and play-back of the student's response before additional instructions are received by the student.

These and other objects of the invention will be made apparent from the following description and the drawing forming a part thereof, wherein:

FIG. 1 shows a schematic arrangement of the various sound tracks on an instructional tape, along with the various recording and play-back devices of the recorder;

FIG. 2 shows a schematic arrangement of the mechanical means for selectively adjusting the interval between the spoken instructions, the student's response thereto and the play-back of the student's response; and FIG. 3 shows a schematic arrangement of the interval of instructional play-back, interval for student consideration and recording of the student's response and interval for play-back of student response upon adjacent sound tracks.

Referring now to the drawings, it will be understood that the components of the recorder will be of conventional construction and operation, except as herein otherwise specifically described and that the components are arranged in a novel manner as shown in the several figures of the drawing.

Prior known tape recorders used in language study have had the draw-back that the student was provided no opportunity for comparing the instructional material reproduced with his own recorded pronunciation. Such prior art devices did provide the student with an opportunity for hearing the instructional material from the instrument and thereafter having his voice recorded. However, in order to have his response played-back in order to compare it with the instructions, he would have to interrupt the movement of the tape and rewind the instructional sound tape back to the beginning of the teaching material in order to listen to the teaching material and to his own recording for comparison. This resulted in loss of time for the student, wear and tear on the recorder and tape and interruptions of the attention of the student to his learning process.

Referring now to FIG. 1 of the drawings, the sound tape 12 is provided with three parallel sound tracks 1, these sound tracks 1 being selectively engaged by a multiple play-back head 26 which by a suitable circuitry 2 and a selector switch 3 carry the sound of the spoken instructions through the amplifier 4 to head phones 5 worn by the student. The tape 12 moving in the direction of the arrow has alongside one longitudinal edge thereof the sound track 6 for recording the student's response. The tape 12 moving in the direction of the arrow first passes track 6 over an erasing head 15, the poles of which are actuated by the circuitry 7 from a recording amplifier 10. The tape then moves beneath the play-back heads 26 giving instructions to the student and at the end of this instruction the student speaking through the microphone 9 and the recording amplifier 10 impresses on the student sound track through the recording head 16 his response to the instructions. Continued movement of the tape thereafter passes the track 6 beneath a student play-back head 17 through the circuitry 11 and the amplifier 4 into the head phones 5 whereby the student hears his own voice.

FIG. 2 of the drawings shows the passage of the tape from the unwinding reel 13 to the rewinding reel 14 wherein the tape 12 after leaving the reel 13 and passing over suitable tensioning devices first engages the erasing head 15 with the student response track 6, then passes beneath the play-back head 26 of the teaching track 1, the recording head 16 for the student's response and thereafter between the pressure roller 19 and drive roller 18 onto the rewind reel 14. During the passage of the tape between the student's recording head 16 and the student play-back head 17, the tape selectively passes over rollers 20, 21, 22 or 23. When the tape passes over the roller 20 a minimum of the student sound track of the tape is available for the student's answer before it is played-back to him through the play-back head 17. As the length of the recorded material on the instructional track increases, the tape 12 is passed over the roller 21 thereby providing a greater length of track for recording the student's answer before the tape reaches the student play-back head 17. Likewise passing the tape over the rollers 22 or 23 provides additional recording space for the student's answers as well as the playing-back of the student's answer before the student track reaches the student play-back head 17.

Upon reference to FIG. 3 of the drawing wherein is shown a schematic arrangement of the portions of the instructional track containing transcribed material and the portions of the student track containing student responses in relation to the erasing head 15, instruction play-back head 26 and student's recording head 16, the functioning of the selective diversion of the tape over the rollers 20, 21, 22 and 23 may be better understood.

As there shown, the succeeding recorded intervals of instructions 24 on the instructional track 1 are followed by two intervals of equal length for recording the student's response 25 and play-back of the student's response on track 6. It will be obvious, therefore, that as the instructional material being played-back over the head 26 increases in length or complexity, the spacing of such instructions on the tape must be increased to provide for the additional time for the student to contemplate the instructions and thereafter give his response thereto before the student sound track reaches the play-back head 17. As shown at the top of FIG. 3, with the tape 12 moving in the direction of the arrow, the student's response 25 began shortly after the termination of the instructional material 24. However, when the tape length of the instructional material is longer or more complex requiring contemplation by the student before responding, the spacing on the respective tracks 1 of the instructional material would have to increase to provide additional tape length for the recording of the student's response and play-back of the response, before he was ready for additional instructions. To take up this extra tape length and thus a greater time interval between the beginning of the student's recording of his response and the play-back thereof over the head 17, the tape must be selectively threaded over the rollers 21, 22 and 23.

In this manner a teaching cycle of one or more repetitions of the instructional material, each followed by recording and play-back of the student's responses, enables the language student to hear his own spoken response and compare it with the next repetition of the spoken instructions to attain greater proficiency in both pronunciation and accent.

I claim:

1. In a sound recording and play-back machine for educational purposes, in combination, spaced rotatable unwinding and take-up reels, a magnetic tape provided with parallel sound tracks of permanently recorded spaced successive portions of instructional material and a blank track for magnetically recording erasable student's responses mounted on said reels, said permanently recorded tracks selectively engaging an instruction track play-back head, and said blank track sequentially engaging a student track erasing head adjacent to said unwinding reel, a student track recording head and a student track play-back head, both last-named heads being downstream of said instruction track play-back head, said student recording and play-back heads being spaced along said tape a variable distance proportional to the length or to the complexity of each portion of the recorded instructional material in passing between said reels.

2. In a sound recording and play-back machine for educational purposes, in combination, spaced rotatable unwinding and take-up reels, a magnetic tape provided with parallel sound tracks of permanently recorded separate successive portions of instructional material and a blank track for magnetically recording erasable student's responses mounted on said reels, said permanently recorded track portions selectively engaging an instruction track play-back head, and said blank track sequentially engaging a student track erasing head adjacent to said unwinding reel, a student track recording head and a student track play-back head, both last-named heads being downstream of said instruction track play-back head, and means for varying at will the length of a loop of said magnetic tape provided between said student recording head and said student play-back head in accordance with the length or with the complexity of each portion of said recorded instructional material.

References Cited in the file of this patent

UNITED STATES PATENTS

| | | |
|---|---|---|
| 2,105,318 | Goldsmith | Jan. 11, 1938 |
| 2,764,639 | Holt | Sept. 25, 1956 |
| 2,777,901 | Dostert | Jan. 15, 1957 |
| 2,804,499 | Butts | Aug. 27, 1957 |
| 2,876,561 | Horne | Mar. 10, 1959 |